(12) United States Patent
Needham et al.

(10) Patent No.: US 9,338,498 B2
(45) Date of Patent: May 10, 2016

(54) SYSTEM AND METHOD FOR DRAWING ANTI-ALIASED LINES IN ANY DIRECTION

(71) Applicant: The DIRECTV Group, Inc., El Segundo, CA (US)

(72) Inventors: Leyland Needham, Redondo Beach, CA (US); Andrew J. Schneider, Irvine, CA (US); Justin T. Dick, Salt Lake City, UT (US); Huy Q. Tran, Westminster, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 14/812,824

(22) Filed: Jul. 29, 2015

(65) Prior Publication Data

US 2015/0334444 A1    Nov. 19, 2015

Related U.S. Application Data

(63) Continuation of application No. 13/294,146, filed on Nov. 10, 2011, now Pat. No. 9,098,938.

(51) Int. Cl.
| | |
|---|---|
| *G06T 11/20* | (2006.01) |
| *G06T 1/60* | (2006.01) |
| *H04N 21/426* | (2011.01) |
| *G06T 11/00* | (2006.01) |
| *G06T 5/00* | (2006.01) |
| *H04N 21/61* | (2011.01) |

(52) U.S. Cl.
CPC ............ *H04N 21/42653* (2013.01); *G06T 1/60* (2013.01); *G06T 5/003* (2013.01); *G06T 11/001* (2013.01); *G06T 11/203* (2013.01); *H04N 21/42692* (2013.01); *H04N 21/6143* (2013.01); *G06T 2200/12* (2013.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 6,141,020 A | * | 10/2000 | Larson | G06T 11/40 345/501 |
| 6,885,378 B1 | * | 4/2005 | Tsai | G06T 15/005 345/541 |
| 7,224,372 B2 | * | 5/2007 | Brown | G06T 11/203 345/611 |
| 2004/0233210 A1 | * | 11/2004 | Hancock | G06F 3/14 345/582 |

* cited by examiner

*Primary Examiner* — Aaron M Richer
(74) *Attorney, Agent, or Firm* — Fitzgerald & Isaacson, LLP

(57) ABSTRACT

A prerendered line texture stored in memory is used to generate an anti-aliased destination line in any direction to be displayed on a screen. A combination of tiling, stretching, and/or mirroring is used to generate the anti-aliased destination line. A blitter blits a rectangle in the prerendered line texture to a destination rectangle in the frame buffer that is displayed on the screen.

18 Claims, 12 Drawing Sheets

SYSTEM AND METHOD FOR DRAWING ANTI-ALIASED LINES IN ANY DIRECTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

Embodiments relate to efficient line drawing on a video display. More particularly, embodiments relate to drawing anti-aliased lines in any direction using a single prerendered line texture.

2. Background

Conventional set top boxes display lines on a video display, such as a television screen by rendering the lines directly to a frame buffer using the CPU or by creating a large line texture that stores the entire length of the line. Rendering a line directly using the CPU diverts CPU processing from other tasks that it might otherwise perform.

Storing a large line texture can require significant amounts of scarce memory resources. For example, to store a texture required to render a line across an entire 1920×1080 high definition screen requires 2,073,600 bytes of memory. Four times that amount is required to store a full color rendering of the line. As a result, storage of large line textures can be wasteful of available memory resources.

Another issue is that drawing must be to the frame buffer as the frame buffer is what is displayed on the screen. However, such drawing typically requires pixel-by-pixel drawing to the frame buffer. This requires constantly moving memory between user-space memory and kernel-space memory, which can be very costly in terms of performance.

SUMMARY

To overcome the aforementioned problems, a prerendered line texture stored in memory is used to generate an anti-aliased destination line in any direction to be displayed on a screen. A combination of tiling, stretching, and/or mirroring is used to generate the anti-aliased destination line. In one or more embodiments, a blitter blits a rectangle in the prerendered line texture to a destination rectangle in the frame buffer that is displayed on the screen.

In one or more embodiments, a system for rendering a line on a screen display includes a memory and a frame buffer to store data to be displayed on the screen display, a processor to create a prerendered line texture comprising a plurality of pixels to store in the memory, the processor to generate a source rectangle in the memory and a destination rectangle in a frame buffer that corresponds to at least a portion of a destination line, and a blitter to blit the prerendered line texture from the source rectangle in the memory to the destination rectangle in the frame buffer. In one or more embodiments, the destination line may be a destination diagonal line having a vertical component and a horizontal component, wherein the blitter stretches the prerendered line texture in a direction corresponding to the longer of the vertical and horizontal components and tiles the prerendered line texture in a direction corresponding to the shorter of the vertical and horizontal components.

In one or more embodiments, a method for rendering a line on a screen display includes storing a prerendered line texture having a plurality of pixels in a memory, generating a source rectangle in the memory, generating a destination rectangle in a frame buffer that corresponds to at least a portion of a destination line to be displayed on the screen display, and blitting the prerendered line texture from the source rectangle in the memory to the destination rectangle in the frame buffer. In some embodiments, the destination line may be a destination diagonal line having a vertical component and a horizontal component, and the method may further include stretching the prerendered line texture in a direction corresponding to the longer of the vertical and horizontal components and tiling the prerendered line texture in a direction corresponding to the shorter of the vertical and horizontal components.

Additional features and embodiments will be evident in view of the following detailed description.

DETAILED DESCRIPTION

Figure 1:
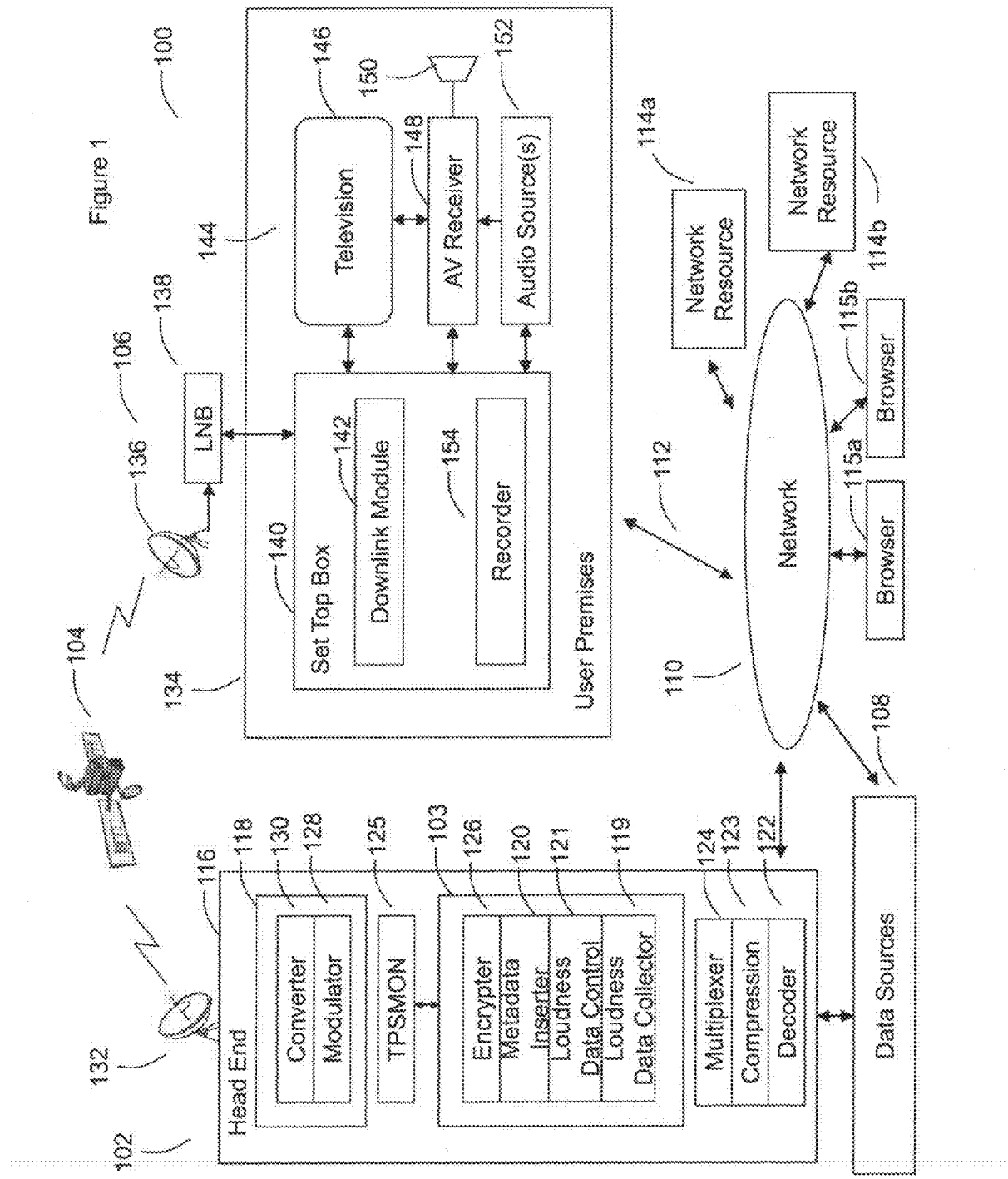
FIG. 1 is a schematic diagram of an exemplary system for providing television services in a television broadcast system, such as a television satellite service provider, in accordance with one or more embodiments.

FIG. 1 is a schematic diagram of an exemplary system 100 for providing television services in a television broadcast system, such as a television satellite service provider, according to one or more embodiments. As shown in FIG. 1, exemplary system 100 is an example direct-to-home (DTH) transmission and reception system 100. The example DTH system 100 of FIG. 1 generally includes a transmission station 102, a satellite/relay 104, and a plurality of receiver stations, one of which is shown at reference numeral 106, between which wireless communications are exchanged at any suitable frequency (e.g., Ku-band and Ka-band frequencies). As described in detail below with respect to each portion of the system 100, information from one or more of a plurality of data sources 108 is transmitted from transmission station 102 to satellite/relay 104. Satellite/relay 104 may be at least one geosynchronous or geo-stationary satellite. In turn, satellite/relay 104 rebroadcasts the information received from transmission station 102 over broad geographical area(s) including receiver station 106. Exemplary receiver station 106 is also communicatively coupled to transmission station 102 via a network 110. Network 110 can be, for example, the Internet, a local area network (LAN), a wide area network (WAN), a conventional public switched telephone network (PSTN), and/or any other suitable network system. A connection 112 (e.g., a terrestrial link via a telephone line and cable) to network 110 may also be used for supplemental communications (e.g., software updates, subscription information, programming data, information associated with interactive programming, etc.) with transmission station 102 and/or may facilitate other general data transfers between receiver station 106 and one or more network resources 114a and 114b, such as, for example, file servers, web servers, and/or databases (e.g., a library of on-demand programming).

Data sources 108 receive and/or generate video, audio, and/or audiovisual programming including, for example, television programming, movies, sporting events, news, music, pay-per-view programs, advertisement(s), game(s), etc. In the illustrated example, data sources 108 receive programming from, for example, television broadcasting networks, cable networks, advertisers, and/or other content distributors. Further, example data sources 108 may include a source of program guide data that is used to display an interactive program guide (e.g., a grid guide that informs users of particular programs available on particular channels at particular times and information associated therewith) to an audience. Users can manipulate the program guide (e.g., via a remote control) to, for example, select a highlighted program for viewing and/or to activate an interactive feature (e.g., a program information screen, a recording process, a future showing list, etc.) associated with an entry of the program guide. Further, example data sources 108 include a source of on-demand programming to facilitate an on-demand service.

An example head-end 116 includes a decoder 122 and compression system 123, a transport processing system (TPS) 103 and an uplink module 118. Decoder 122 decodes the information by, for example, converting the information into data streams. Compression system 123 compresses the bit streams into a format for transmission, for example, MPEG-2 or MPEG-4. In some cases, AC-3 audio is not decoded, but passed directly through without first decoding. In such cases, only the video portion of the source data is decoded.

In some embodiments, multiplexer 124 multiplexes the data streams generated by compression system 123 into a transport stream so that, for example, different channels are multiplexed into one transport. Further, in some cases a header is attached to each data packet within the packetized data stream to facilitate identification of the contents of the data packet. In other cases, the data may be received already transport packetized.

TPS 103 receives the multiplexed data from multiplexer 124 and prepares the same for submission to uplink module 118. TPS 103 includes a loudness data collector 119 to collect and store audio loudness data in audio provided by data sources 108, and provide the data to a TPS monitoring system in response to requests for the data. TPS 103 also includes a loudness data control module 121 to perform loudness control (e.g., audio automatic gain control (AGC)) on audio data received from data source 108. Generally, example metadata inserter 120 associates the content with certain information such as, for example, identifying information related to media content and/or instructions and/or parameters specifically dedicated to an operation of one or more audio loudness operations. For example, in an embodiment, metadata inserter 120 replaces scale factor data in the MPEG-1, layer II audio data header and dialnorm in the AC-3 audio data header in accordance with adjustments made by loudness data control module 121.

In the illustrated example, the data packet(s) are encrypted by an encrypter 126 using any suitable technique capable of protecting the data packet(s) from unauthorized entities.

Uplink module 118 prepares the data for transmission to satellite/relay 104. In an embodiment, uplink module 118 includes a modulator 128 and a converter 130. During operation, encrypted data packet(s) are conveyed to modulator 128, which modulates a carrier wave with the encoded information. The modulated carrier wave is conveyed to converter 130, which, in the illustrated example, is an uplink frequency converter that converts the modulated, encoded bit stream to a frequency band suitable for reception by satellite/relay 104. The modulated, encoded bit stream is then routed from uplink frequency converter 130 to an uplink antenna 132 where it is conveyed to satellite/relay 104.

Satellite/relay 104 receives the modulated, encoded bit stream from the transmission station 102 and broadcasts it downward toward an area on earth including receiver station 106. Example receiver station 106 is located at a subscriber premises 134 having a reception antenna 136 installed thereon that is coupled to a low-noise-block downconverter (LNB) 138. LNB 138 amplifies and, in some embodiments, downconverts the received bitstream. In the illustrated example of FIG. 1, LNB 138 is coupled to a set-top box 140. While the example of FIG. 1 includes a set-top box, the example methods, apparatus, systems, and/or articles of manufacture described herein can be implemented on and/or in conjunction with other devices such as, for example, a personal computer having a receiver card installed therein to enable the personal computer to receive the media signals described herein, and/or any other suitable device. Additionally, the set-top box functionality can be built into an A/V receiver or a television 146.

Example set-top box 140 receives the signals originating at head-end 116 and includes a downlink module 142 to process the bitstream included in the received signals. Example downlink module 142 demodulates, decrypts, demultiplexes, decodes, and/or otherwise processes the bitstream such that the content (e.g., audiovisual content) represented by the bitstream can be presented on a display device of, for example, a media presentation system 144. Example media presentation system 144 includes a television 146, an AV receiver 148 coupled to a sound system 150, and one or more audio sources 152. As shown in FIG. 1, set-top box 140 may route signals directly to television 146 and/or via AV receiver 148. In an embodiment, AV receiver 148 is capable of controlling sound system 150, which can be used in conjunction with, or in lieu of, the audio components of television 146. In an embodiment, set-top box 140 is responsive to user inputs to, for example, tune a particular channel of the received data stream, thereby displaying the particular channel on television 146 and/or playing an audio stream of the particular channel (e.g., a channel dedicated to a particular genre of music) using the sound system 150 and/or the audio components of television 146. In an embodiment, audio source(s) 152 include additional or alternative sources of audio information such as, for example, an MP3 player (e.g., an Apple® iPod®), a Blueray® player, a Digital Versatile Disc (DVD) player, a compact disc (CD) player, a personal computer, etc.

Further, in one or more embodiments, example set-top box 140 includes a recorder 154 capable of recording information on a storage device such as, for example, analog media (e.g., video tape), computer readable digital media (e.g., a hard disk drive, a digital versatile disc (DVD), a compact disc (CD), flash memory, etc.), and/or any other suitable storage device.

Figure 2:
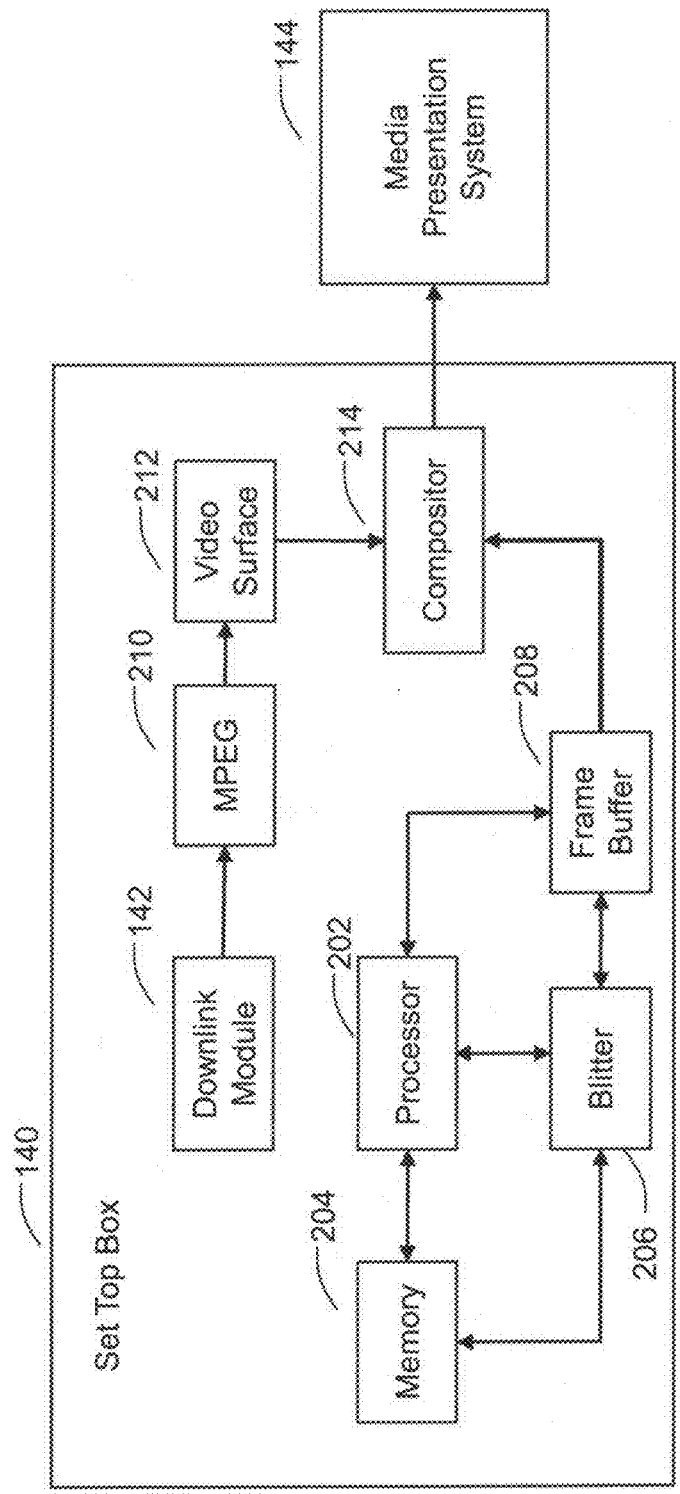
FIG. 2 is a simplified schematic diagram of an exemplary set top box in accordance with one or more embodiments.

FIG. 2 is a simplified schematic diagram of an exemplary set top box (STB) 140 according to an embodiment. Such a set top box can be, for example, in the DIRECTV HR2x family of set top boxes. As shown in FIG. 2, STB 140 includes a downlink module 142 described above. In an embodiment, downlink module 142 is coupled to an MPEG decoder 210 that decodes the received video stream and stores it in a video surface (memory) 212.

A processor 202 controls operation of STB 140. Processor 202 can be any processor that can be configured to perform the operations described herein for processor 202. Processor 202 has accessible to it a memory 204. As will be described in detail below, memory 204 is used to store a prerendered line texture. For example, in an embodiment, the prerendered line texture is a small segment of a line that will be tiled, stretched, and mirrored according to embodiments. Memory 204 can also be used as storage space for recorder 154 (described above). Further, memory 204 can be used to store programs to be run by processor 202 as well as used by processor 202 for other functions necessary for the operation of STB 140 as well as the functions described herein. In alternate embodiments, one or more additional memories may be implemented in STB 140 to perform one or more of the foregoing memory functions.

A blitter 206 performs block image transfer (BLIT or blit) operations. BLIT operations include stretch, tile, and mirror operations. In embodiments, blitter 206 performs BLIT operations on a prerendered line texture stored in memory 204 across a frame buffer 208. In an embodiment, blitter 206 is a co-processor that provides hardware accelerated anti-aliased line drawing. Blitter 206 renders destination lines using reduced memory resources and does not require direct access to the frame buffer. A suitable blitter for use in embodiments is the blitter found in the DIRECTV HR2x family of STBs.

Frame buffer 208 stores an image or partial image to be displayed on media presentation system 144. In an embodiment, frame buffer 208 is a part of memory 204. A compositor 214 receives data stored in frame buffer 208 and video surface 212. In an embodiment, compositor 214 blends the data it receives from frame buffer 208 with the data it receives from video surface 212 and forwards the blended video stream to media presentation 144 for presentation.

In an embodiment, the prerendered line is a small image that is drawn during an initialization process prior to operational use of STB 140 and stored in memory 204. In an embodiment, for example, processor 202 draws the small line segment and stores it in memory 204 prior to a user using STB 140 for entertainment purposes. In an embodiment, the prerendered line texture is 62×62 pixels. However, in practice, the prerendered line texture can be any size, the size being a tradeoff between memory usage and number of BLIT operations required to draw the destination line. In an embodiment, the texture is owned by the system and not modifiable by the user.

In an embodiment, the prerendered line texture is essentially an anti-aliased line at a 45 degree angle. Other angles can be used in alternate embodiments. In an embodiment, lines of different widths are provided by providing different prerendered line textures having different widths.

To save memory, in an embodiment, the texture contains only the alpha color of the pixel. As a result, each pixel requires only one byte to store color information. Not only is memory saved, but true anti-aliasing is performed over live video because color blending is performed by the STB graphic and composition hardware rather than processor 202.

In operation, blitter 208 loads the prerendered line texture into the memory space of the graphics driver, for example frame buffer 208 and performs BLIT operations on the prerendered line texture to render the destination line across the frame buffer 208. In an embodiment, for example, if the line is longer vertically than horizontally, the line is stretched vertically and tiled horizontally. Combining tiling and stretching in this manner allows creation of a smooth destination line of any length and angle. To render lines pointing in a different direction than the prerendered line, processor 202 mirrors the prerendered line texture so that blitter 208 will render the destination line in the correct direction.

The rendered lines can be used anywhere a line is required on a screen. For example, such lines may be used to provide a user interface on a screen, including, for example, boundaries around text, separators between text, grids, and any other lines required to create the user interface.

Figure 3:
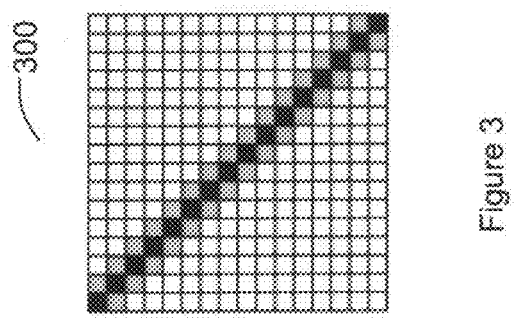
FIG. 3 is an exemplary prerendered line texture in accordance with one or more embodiments.

FIG. 3 is an exemplary prerendered line texture 300 according to an embodiment. Prerendered line texture 300 has a size of, for example, 16×16 pixels. Prerendered line texture 300 can have any pixel size, the tradeoff being memory usage versus number of required BLIT operations. In an embodiment, for example, the prerendered line texture contains an anti-aliased line at a 45-degree angle. In practice, for modern screen sizes, such a high definition screen having, for example, 1920×1080 pixels, a texture size of 62×62 pixels has been found to work well. Further, in an embodiment, the line texture can be other than square and other than 45 degrees. However, square and 45 degrees is preferred.

Black pixels in prerendered line texture 300 represent opaque pixels. Gray pixels in prerendered line texture 300 represent semi-transparent pixels. The semi-transparent pixels provide the anti-aliasing effect when the blitter renders the destination line over a background by rendering the destination line to the frame buffer. Prerendered line texture 300 has a line width of 1.5 pixels. Other widths can be used. In addition, there may be additional layer(s) of semi-transparent pixels with lines having greater widths.

In an embodiment, prerendered line textures of different widths can be provided by different textures. If the destination line is pointing in a different direction than the prerendered line texture, the destination line may be rendered using a mirroring operation that logically flips the prerendered line texture about its vertical axis at the center of the prerendered line texture so that it will cause rendering in the direction of the destination line. As an alternative, multiple line textures pointing in different directions may be stored.

Figure 4A:
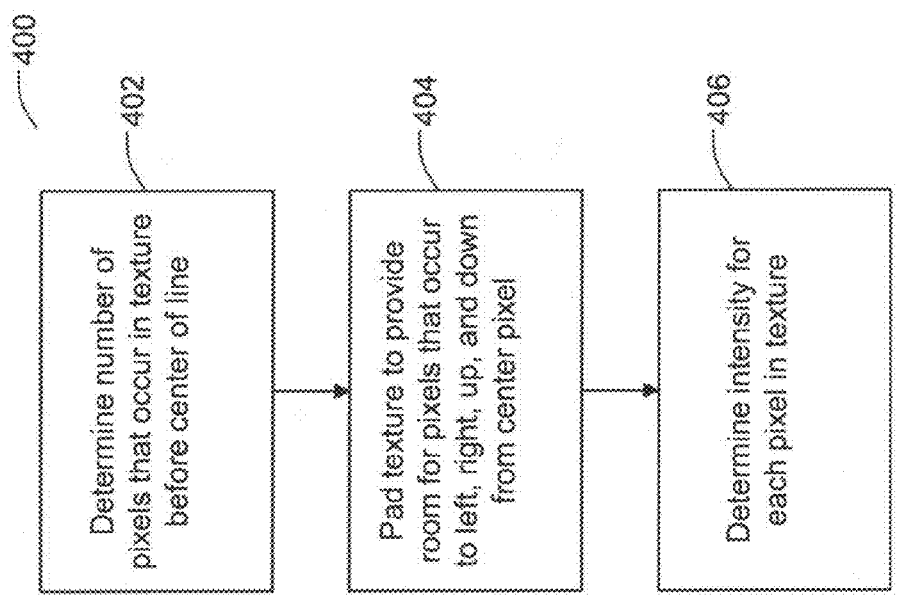
FIG. 4a is a flowchart for generating a prerendered line texture in accordance with one or more embodiments.

FIG. 4a is a flowchart 400 for generating a prerendered texture, such as prerendered texture 300, according to an embodiment. In step 402, the number of pixels that occur in the texture before the center of the prerendered line is determined. In step 404, the texture is padded to provide room for pixels that occur left, right, up, or down from the center pixel. In step 406, the intensity of each pixel in the texture is determined. In an embodiment, pixel intensity ranges from 0 to 255. In an embodiment, the steps in flowchart 400 are performed by a processor such as processor 202.

Figure 4B:
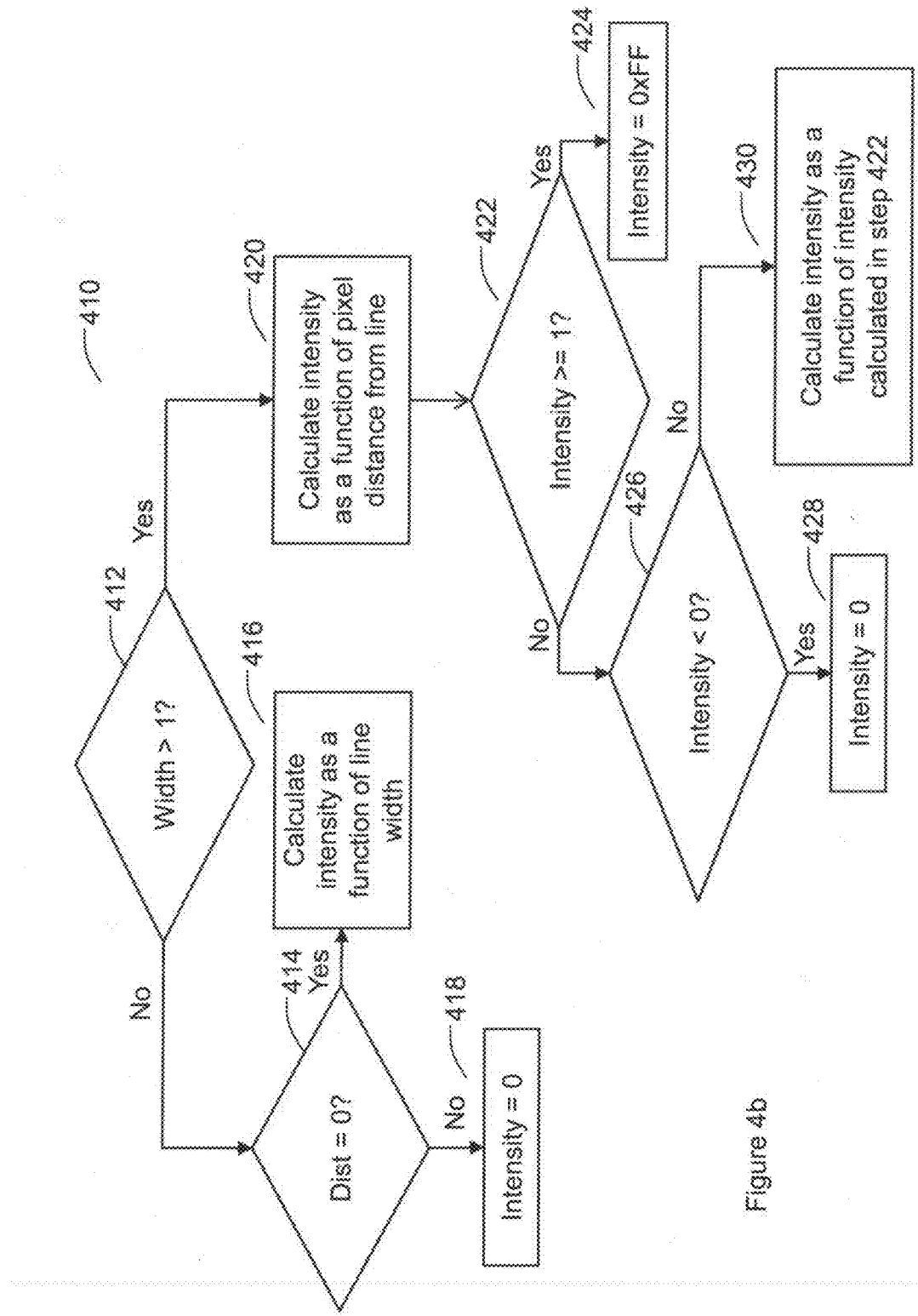
FIG. 4b is a flowchart for determining pixel intensity in accordance with one or more embodiments.

FIG. 4b is a flowchart 410 for determining pixel intensity in step 406 according to an embodiment. In step 412, a determination is made as to whether the line width is greater than 1. If the line width is less than or equal to 1, processing continues in step 414, where a determination is made as to the pixel's distance from the line. If the distance is 0, processing continues in step 416, where intensity is determined as a function of line width. For example, in an embodiment, the intensity is determined as the ratio of the line width to 1. If the determined distance is not 0 in step 414, processing continues in step 418 where the pixel's intensity is set to 0.

If in step 412, the line width is determined to be greater than 1, processing continues in step 420 where a pixel value intensity is calculated for the pixel. In an embodiment, the pixel intensity calculation is based on the pixel's distance from the line. In an embodiment, the calculated value is used to set pixels further away from the line with lower intensity values.

Processing continues in step 422 where a determination is made as to whether the calculated intensity is greater than or equal to 1. If so, the pixel's intensity is set to 0xFF (hexadecimal representation of 255). If the intensity calculated in step 422 is less than one, processing continues in step 426 where a determination is made as to whether the intensity calculated in step 422 is less than 0. If so, processing continues in step 428 where the pixel's intensity is set to 0. If the intensity calculated in step 422 is greater than or equal to 0 as determined in step 426, processing continues in step 430 where the pixel's intensity is set to the ratio of the intensity calculated in step 422 over 1.

Pseudo code for generating a prerendered texture according to an embodiment is provided below in Listing 1. In the embodiment, the pseudocode uses fixed point math. For the example pseudo code, Texture_size, size of the texture, is 16 and Line_width, width of the line, is 1.5. The 'fixed' is fixed point number with a 16 bit shift value. i.e. 1=0x10000 and 1.5=0x18000. In an embodiment, this is done to accommodate floating point math using a fixed point processor. In an embodiment, a floating point processor can be used.

Listing 1. Pseudo code for prerendering line texture according to an embodiment.

```
© 2011, The DIRECTV Group, Inc.
create_line_texture(fixed line_width, int texture_width) {
// the line_offset is the number of pixels that occur before
// the center pixel of the line. This often includes a
// fractional pixel, but in an embodiment, full pixels are used
// and the ceiling is taken (+0xFFFF does this)
    int line_offset = fixed_to_int(line_width/2 – 0x8000 + 0xFFFF);
// In an embodiment, all sides of the texture are padded to provide
// room in the texture to hold the pixels that occur
// left, right, up, and down from the center pixel of the line
    int pixel_line_width = line_offset * 2 + 1;
    int width = pixel_line_width + texture_width;
// loop through every pixel of the line texture and calculate
// that pixel's intensity (alpha component) based on its distance
// from the line. In an embodiment, all intensity values are mapped
// between the range of 0-255 (1 byte)
    for (y = 0; y < width; y++)
    {
       for (x = 0; x < width; x++)
       {
          fixed dist = abs( x – y ) << 16;
          if (line_width <= 0x10000)
          {
             // special case if the width of the line is 1 or less
             // pixels are either 0 intensity or have an intensity equal
             // to the ratio of line width over one
             if (dist == 0)
             {
                texture_memory[y*width + x] = line_width *
                  255 / 0x10000;
             }
             else
```

Listing 1. Pseudo code for prerendering line texture according to an embodiment.

```
             {
                texture_memory[y*width + x] = 0x00;
             }
          }
          else
          {
             // line width is greater than 1 pixel
             // intensity is related to the distance of the pixel
             fixed intensity = line_width / 0x20000 + 0x8000 – dist;
             if (intensity >= 0x10000)
             {
                texture_memory[y*width + x] = 0xFF;
             }
             else if (intensity < 0)
             {
                texture_memory[y*width + x] = 0x00;
             }
             else
             {
                texture_memory[y*width + x] = intensity * 255 / 0x10000;
             }
          }
       }
    }
}
© 2011, The DIRECTV Group, Inc.
```

To render a line, that is to draw the line in the screen, the line texture is blitted in specific ways to create a destination line of the correct length and angle. To accomplish this, a combination of stretching, tiling, and/or mirroring is performed on the line texture by the blitter to transfer the line texture onto the screen to create a destination line having the desired characteristics in the desired direction. For destination diagonal lines, stretching controls the slope of the destination diagonal line to create lines of different angles. Tiling the stretched line prevents the line from losing its smooth edge or becoming blocky. In a preferred embodiment, if the destination diagonal line is longer vertically than horizontally, then the prerendered line texture is stretched vertically and tiled horizontally. If, on the other hand, the destination diagonal line is longer horizontally than vertically, the prerendered line texture is stretched horizontally and tiled vertically. This is done because stretching is a more efficient operation than tiling. Further, in an embodiment, because the pixels are being rendered in the alpha channel, the blitter automatically alpha blends the line with whatever is appearing on the screen behind the line.

The destination line is the line the user desires to be displayed on the screen. In an embodiment, the user specifies where the line is to appear on the screen by providing the coordinates of the line. In an embodiment, the coordinates are provided as a begin point and an end point in the screen (frame buffer) space. For example, a destination line may be defined by the start point (x1, y1) and the end point (x2, y2). In pixels, the horizontal component of the destination line is abs(x2−x1) and the vertical component is abs(y2−y1), where abs is the absolute value function. Where abs(x2−x1) is 0, the destination line is vertical. Where abs(y2−y1) is 0, the destination line is horizontal. Where neither abs(x2−x1) or abs(y2−y1) is 0, the destination line is diagonal and referred to herein as a destination diagonal line.

In an embodiment, purely horizontal or purely vertical lines are created by stretch blitting a single line pixel width slice of the prerendered line texture onto the screen the desired horizontal or vertical distance. In an embodiment, because the prerendered line texture has built-in anti-aliasing using the alpha component, the anti-aliased portion of the line needs to be blit as well.

Figure 5B:
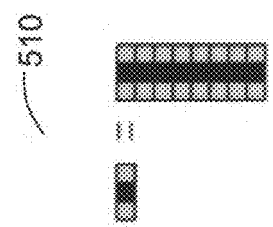
FIG. 5b is an exemplary stretch blit of a horizontal line using a single pixel line pixel width from a prerendered line texture.
Figure 5A:
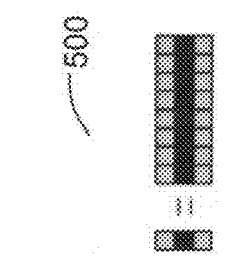
FIG. 5a is an exemplary stretch blit of a vertical line using a single pixel line pixel width from a prerendered line texture.

FIG. 5a is an exemplary stretch blit 500 of a vertical line using a single pixel line pixel width from prerendered line texture 300. Pseudo code for rendering a horizontal line according to an embodiment is provided in Listing 2.

Listing 2. Pseudo code for rendering horizontal line according to an embodiment

```
© 2011, The DIRECTV Group, Inc.
void blit_horizontal_line (int x1, int y1, int x2, int y2)
{
  //(x1, y1) is the first point in the screen of the line being rendered
  //(x2, y2) is the second point in the screen of the line being rendered
  //For a horizontal line, y1=y2.
  // In an embodiment, line_offset is the offset into the line_texture to
  // pull from to perform the blit
  int line_offset = fixed_to_int(line_width / 0x20000 − 0x8000 +
  0xFFFF);
  source_rectangle.x = line_offset;
  source_rectangle.y = 0;
  source_rectangle.width = 1;
  source_rectangle.height = line_offset * 2 + 1;
  //destination line to render
  dest_rectangle.x = x1;
  dest_rectangle.y = y1 − line_offset;
  dest_rectangle.width = x2 − x1 + 1;
  dest_rectangle.height = line_offset * 2 + 1;
  // Call blit function to render the line from source rectangle in
  // prerendered line texture to destination rectangle in screen with
  the desired width (x2−x1+1)
  blit(line_texture, source_rectangle, dest_rectangle);
}
© 2011, The DIRECTV Group, Inc.
```

FIG. 5b is an exemplary stretch blit 510 of a horizontal line using a single pixel line pixel width from prerendered line texture 300. Pseudo code for rendering a vertical line according to an embodiment is provided in Listing 3.

Listing 3. Pseudo code for rendering vertical line according to an embodiment

```
© 2011, The DIRECTV Group, Inc.
void blit_vertical_line(int x1, int y1, int x2, int y2)
{
  //(x1, y1) is the first point in the screen of the line being rendered
  //(x2, y2) is the second point in the screen of the line being rendered
  //For a vertical line, x1=x2.
  // In an embodiment, line_offset is the offset into the line_texture to
  // pull from to perform the blit
  int line_offset = fixed_to_int(line_width / 0x20000 −
  0x8000 + 0xFFFF);
  source_rectangle.x = 0;
  source_rectangle.y = line_offset;
  source_rectangle.width = line_offset * 2 + 1;
  source_rectangle.height = 1;
  dest_rectangle.x = x1 − line_offset;
  dest_rectangle.y = y1;
  dest_rectangle.width = line_offset * 2 + 1;
  dest_rectangle.height = y2 − y1 + 1;
  // Call blit function to render the line from source rectangle in
  // prerendered line texture to destination rectangle in screen with
  the desired height (y2−y1+1)
  blit(line_texture, source_rectangle, dest_rectangle);
}
© 2011, The DIRECTV Group, Inc.
```

Figure 6:
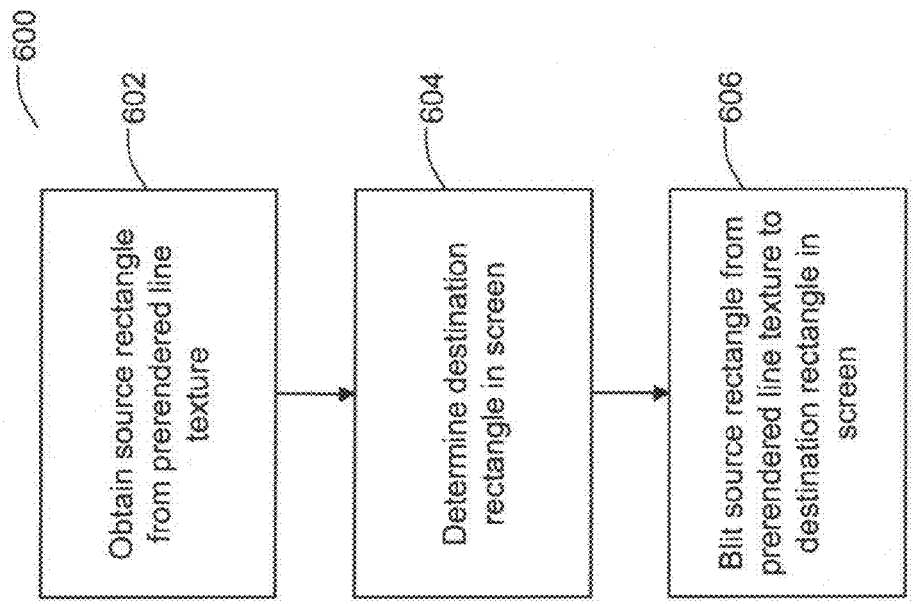
FIG. 6 is a flow chart for rendering a horizontal or vertical line in accordance with one or more embodiments.

FIG. 6 is a flow chart 600 for rendering a horizontal or vertical line according to an embodiment. In step 602, a source rectangle is obtained from the prerendered line texture. In an embodiment, the source rectangle is a single pixel line pixel width as shown, for example, in FIGS. 5a and 5b. In step 604 a destination rectangle in the screen is determined. In an embodiment, the destination rectangle is determined as a function of the screen coordinates of the desired line to be rendered in the screen. In step 606, the source rectangle is blitted to the destination rectangle and effectively stretched vertically or horizontally (as required by the destination line to be rendered) to be the desired line length.

In an embodiment, destination diagonal lines, that is lines having a non-zero horizontal component and a non-zero vertical component, are created by a combination of tiling, stretching, and, in some cases, mirroring the prerendered line texture. Because, in an embodiment, stretching is a more efficient operation than tiling, when creating a destination diagonal line, stretching is used for the longer component, and tiling is used for the shorter component. Thus, if the destination diagonal line to be created has a longer vertical component than horizontal component, the destination diagonal line is created by stretching the prerendered line texture vertically and tiling the stretched prerendered line texture horizontally. If, on the other hand, the destination diagonal line to be created has a longer horizontal component than vertical component, the destination diagonal line is created by stretching the prerendered texture horizontally and tiling the stretched prerendered line texture in the vertical direction.

Figure 7A:
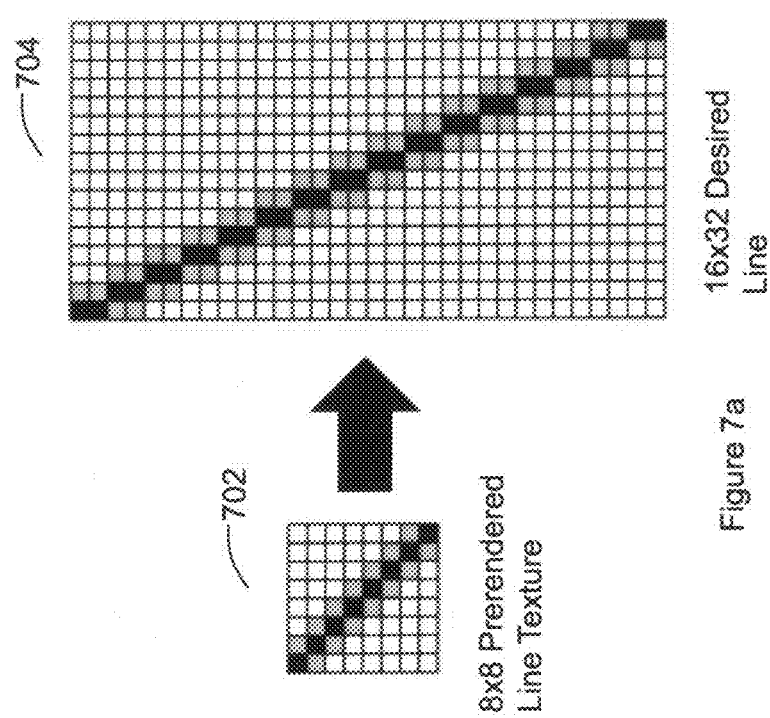
FIG. 7a illustrates creating a destination diagonal line from a prerendered line texture in accordance with one or more embodiments.

FIG. 7a illustrates creating a destination diagonal line 702 from a prerendered line texture 704 according to an embodiment. Exemplary prerendered line texture 704 has dimensions of 8×8 pixels. In the example, of FIG. 7a, destination diagonal line 702 has a width of 16 pixels and a length of 32 pixels. In an embodiment, the pixel dimensions of desired line 702 are obtained from the coordinates in the destination screen (frame buffer) to which the line is to be drawn. For example, if prerendered line texture 704 is to be drawn to the points (10,20), (26,52) in the destination screen, the destination diagonal line dimensions would be 16×32 pixels.

Because, in the example illustrated in FIG. 7a, the vertical component of destination diagonal line 702 is greater than the horizontal component, in an embodiment, prerendered line texture 704 is stretched vertically and tiled horizontally to generate destination diagonal line 702. The number of tiles and amount of stretching for the illustration of FIG. 7a is described below with respect to FIG. 8.

Figure 7B:
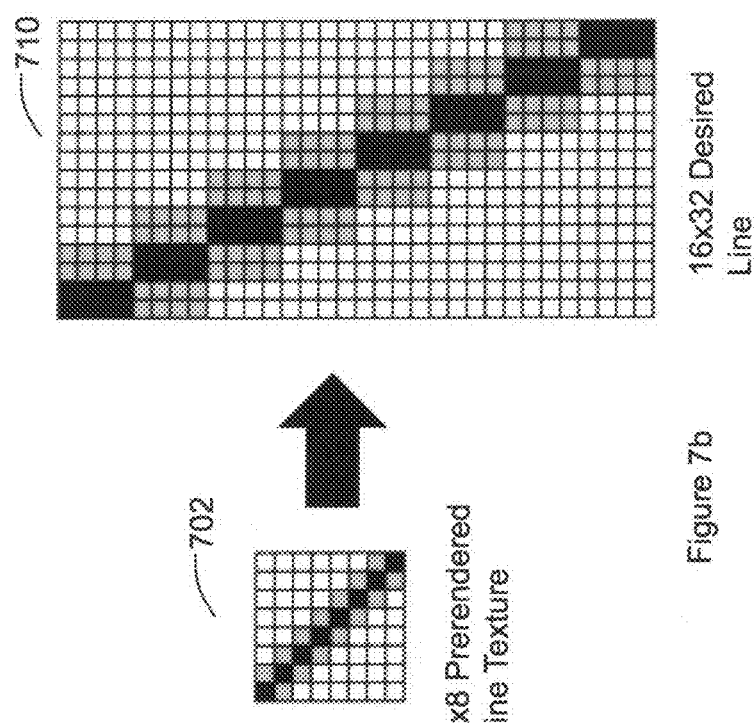
FIG. 7b illustrates creating a destination diagonal line in accordance with one or more embodiments.

FIG. 7b illustrates creating a destination diagonal line 710 according to another embodiment. In the embodiment of FIG. 7b, destination diagonal line 710 is created by stretching in both directions rather than using tiling as described above with respect to FIG. 7a. As can be seen in FIG. 7b, while stretching in both directions can be used to create a destination diagonal line in an embodiment, it may result in a blockier looking line rendering. The amount of stretching for the illustration of FIG. 7b is described below with respect to FIG. 8.

In an embodiment, a destination diagonal line that is longer than the line of the prerendered line texture is generated using multiple blits of the prerendered line texture to destination rectangles in the frame buffer. For each blit, the coordinates of the destination rectangle in the frame buffer is changed to generate a smooth destination diagonal line. As described in more detail below, the size of the destination rectangles is determined as a function of the size of the prerendered line texture in pixels in the direction of the shorter component of the destination diagonal line and the number of blits required. When the destination diagonal line is shorter than the line of the prerendered line texture, in an embodiment, the prerendered line texture is only stretched to generate the destination diagonal line.

Figure 8:
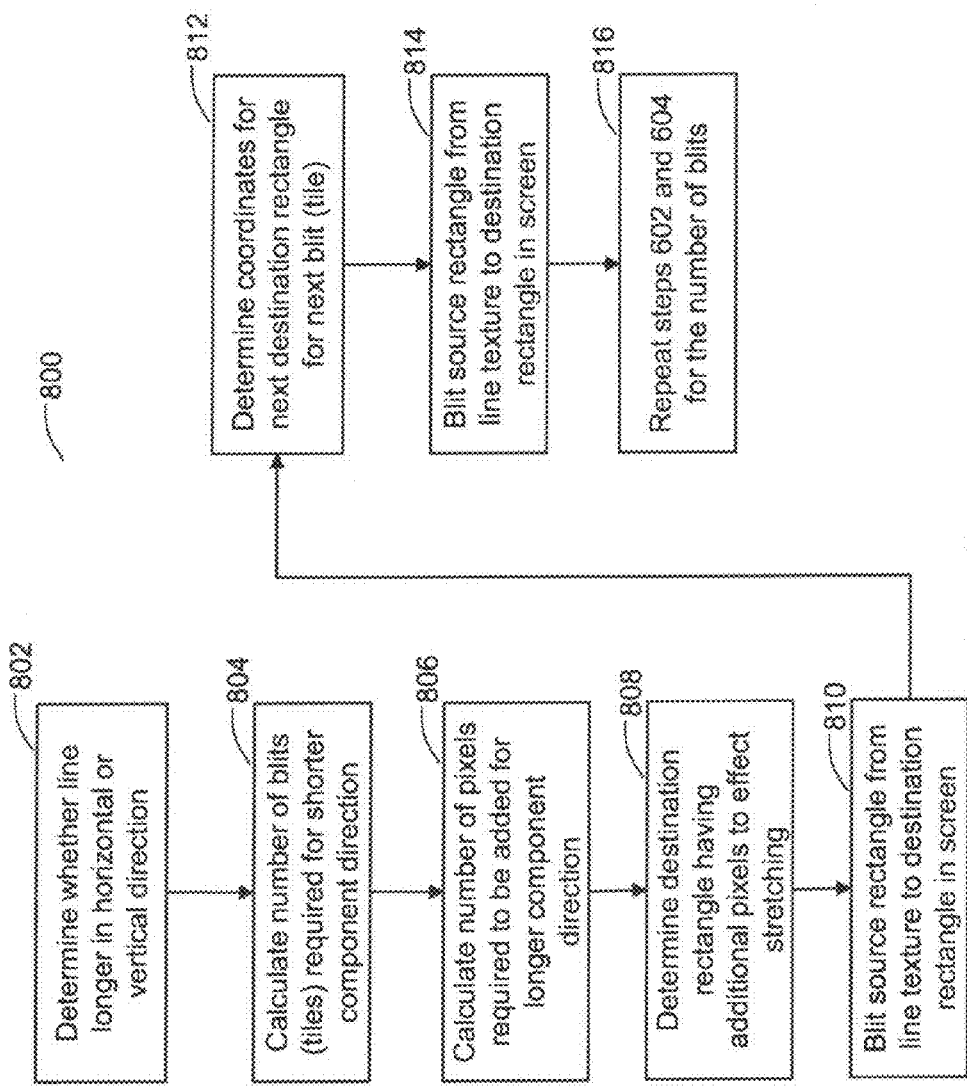
FIG. 8 is a flow chart for generating a diagonal line from a prerendered line texture in accordance with one or more embodiments.

FIG. 8 is a flow chart 800 for generating a destination diagonal line from a prerendered line texture according to an embodiment. In step 802, a determination is made as to which component of the destination diagonal line is longer. As described above, stretching is performed in the direction of the longer component of the destination diagonal line, and tiling is performed in the direction of the shorter component of the destination diagonal line. In step 804, the number of blits required is calculated. In an embodiment, the number of blits is equivalent to the number of tiles. For example, referring to FIG. 7a, blitting line texture 704 horizontally twice effectively tiles line texture 702 in the horizontal direction twice, giving the required 16 pixels. The number of blits required is determined by dividing the number of pixels for the smaller component of destination diagonal line by the width of the prerendered line texture. In the example of FIG. 7a, this equates to 2 blits (16 bits in the shorter horizontal direction of destination diagonal line 702 divided by 8 bits in the width of prerendered line texture 704). In step 806, the number of pixels required to be added in each destination blit is determined. The number of pixels to be added provides the required stretching. Step 806 is described in more detail with respect to FIG. 9 and its accompanying text.

In step 808, a destination rectangle is determined. The destination rectangle is determined as having the additional pixels required to effectuate the stretching operation described above. In an embodiment, the blitter, such as blitter 206 performs the stretching described above as part of its functionality. As a result, the stretching need not be programmed independently. Thus, the destination rectangle in the example of FIG. 7a would have dimensions of 8×16 pixels. In step 810, the source rectangle, in this case the line texture, is blitted to the destination rectangle.

In step 812, coordinates for the next destination rectangle for the next blit (tile) are determined to make the destination line continuous. In step 814, the source rectangle, the line texture, is blitted to the destination rectangle defined by the new coordinates. In step 816, steps 812 and 814 are repeated for the number of blits (tiles).

Figure 9:
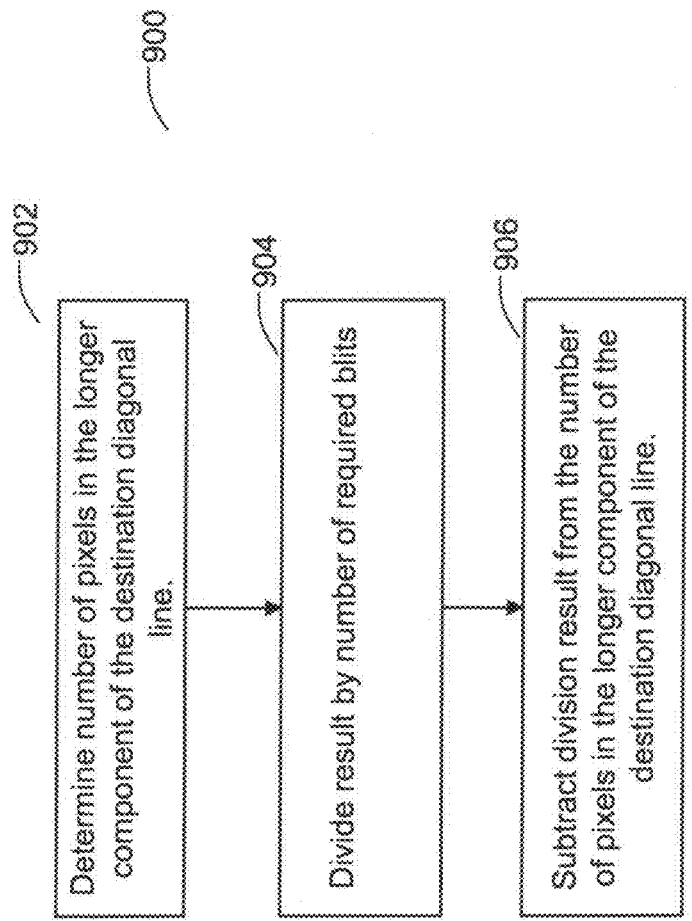
FIG. 9 is a flow chart for determining the number of pixels to be added to generate the required stretch in accordance with one or more embodiments.

FIG. 9 is a flow chart 900 for determining the number of pixels to be added to generate the required stretch in step 806 according to an embodiment. In step 902 the number of pixels in the direction of the longer component of the destination line is determined. In an embodiment, this can be determined as the absolute value of the delta of the coordinates of the longer component of the destination diagonal line. In step 904, the calculated number of pixels is divided by the number of required blits. In step 906, the number of pixels in the prerendered line in the direction of the longer component of the destination diagonal line is subtracted from the result of the division in step 904. This difference is the total number of pixels that needs to be added in each destination blit. That is, this difference is used as the dimension of the destination rectangle in the direction of the longer component of the destination diagonal line for each blit.

For example, in the illustration in FIG. 7a, the number of required blits is 2. The number of pixels in the longer component (vertical) of destination diagonal line 702 is 32. Dividing this number of pixels by the number of required blits yields 16 pixels. The number of pixels in the component of prerendered line 704 in the same direction (vertical) is 8. Because prerendered line texture 704 is square, its width or height in pixels could be used as a default for the present calculations. Subtracting 8 from the division result (16) yields 8 pixels. Thus, 8 pixels must be added in each stretch to generate the desired destination diagonal line.

Pseudocode for creating a destination diagonal line having a longer vertical component and in the same direction as the prerendered line texture as described in flow chart 800 according to an embodiment is provided in listing 4.

Listing 4. Pseudo code for rendering stretched vertical line in direction of prerendered line texture according to an embodiment.

```
© 2011, The DIRECTV Group, Inc.
void blit_stretched_vertical_lines(int x1, int y1, int x2, int y2)
// (x1,y1) is the start point on the screen for the destination diagonal line
// (x2,y2) is the end point on the screen for the destination diagonal line
{
  int x_delta = x2 – x1 + 1, y_delta = y2 – y1 + 1;
  int absolute_x_delta = abs(x2 – x1), absolute_y_delta = abs(y2 – y1);
  int blit_count = absolute_x_delta / texture_width + 1;
  int prev_x = 0, prev_y = 0, next_x = 0, next_y = 0;
  for (int i = 0; i < blit_count; i++)
  {
    next_x = (i + 1) * x_delta / blit_count;
    next_y = next_x * y_delta / x delta;
    source.x = line_offset;
    source.y = line_offset;
    source.width = next_x – prev_x;
    source.height = next_x – prev_x + line_offset;
    dest.x = prev_x + x1;
    dest.y = prev_y + y1;
    dest.width = next_x – prev_x;
    dest.height = next_y – prev_y;
    // In an embodiment, value are modified depending on if it is the first,
    // last, or a middle blit
    if (i == 0) // First blit
    {
      source.x –= line_offset;
      source.width += line_offset;
      dest.x –= line_offset;
      dest.width += line_offset;
      dest.height = (next_x + line_offset) * (y_delta / x_delta) –
          prev_y;
    } else if (i == blit_count – 1) //last blit
    {
      source.y –= line_offset;
      source.width += line_offset;
      dest.height = next_y – (prev_x – line_offset) * y_delta /
          x_delta;
      dest.width += line_offset;
      dest.y = y1 + (prev_x – line_offset) * y_delta / x_delta;
    } else // middle blit
    {
      source.y –= line_offset;
      source.height += line_offset;
      dest.y = (prev_x – line_offset) * y_delta / x_delta + y1;
      dest.height = ((next_x + line_offset) * y_delta / x_delta) –
          ((prev_x – line_offset) * y_delta / x_delta);
    }
    blit(line_texture, source, dest);
    prev_x = next_x; prev_y = next_y;
  }
}
© 2011, The DIRECTV Group, Inc.
```

Pseudocode for creating a destination diagonal line having a longer horizontal component and in the same direction as the prerendered line texture as described in flow chart 800 according to an embodiment is provided in listing 5.

Listing 5. Pseudo code for rendering stretched horizontal line in direction of prerendered line texture according to an embodiment.

```
© 2011, The DIRECTV Group, Inc.
void blit_stretched_horizontal_lines(int x1, int y1, int x2, int y2)
// (x1,y1) is the start point on the screen for the destination diagonal line
// (x2,y2) is the end point on the screen for the destination diagonal line
{
  int x_delta = x2 – x1 + 1, y delta = y2 – y1 + 1;
  int absolute_x_delta = abs(x2 – x1), absolute_y_delta =
      abs(y2 – y1);
  int blit_count = absolute_y_delta / texture_width + 1;
  int prev_x = 0, prev_y = 0, next_x = 0, next_y = 0;
  for (int i = 0; i < blit_count; i++)
  {
    next_x = (i + 1) * y_delta / blit_count;
```

Listing 5. Pseudo code for rendering stretched horizontal line in direction of prerendered line texture according to an embodiment.

```
        next_y = next_x * x_delta / y_delta;
        source.x = line_offset;
        source.y = line_offset;
        source.width = next_y - prev_y + line_offset;
        source.height = next_y - prev_y;
        dest.x = prev_x + x1;
        dest.y = prev_y + y1;
        dest.width = next_x - prev_x;
        dest.height = next_y - prev_y;
        // In an embodiment, values are modified depending on if it is the
        // first, last, or a middle blit
        if (i == 0) //first blit
        {
           source.y -= line_offset;
           source.height += line_offset;
           dest.y -= line_offset;
           dest.width += line_offset;
           dest.height = (next_y + line_offset) * (x_delta /
           y_delta) - prev_x;
        } else if (i == blit_count - 1) //last blit
        {
           source.x -= line_offset;
           source.height += line_offset;
           dest.width = next_x - (prev_y - line_offset) *
           x_delta / y_delta;
           dest.height += line_offset;
           dest.x = x1 + (prev_y - line_offset) * x_delta /
           y_delta;
        } else // middle blit
        {
           source.x -= line_offset;
           source.width += line_offset;
           dest.x = (prev_y - line_offset) * x_delta /
           y_delta + x1;
           dest.height = ((next_y + line_offset) * x_delta /
           y_delta) - ((prev_y - line_offset) * x_delta / y_delta);
        }
        blit(line_texture, source, dest);
        prev_x = next_x; prev_y = next_y;
     }
}
© 2011, The DIRECTV Group, Inc.
```

In an embodiment, lines can be drawn in any direction, not just the direction of the prerendered line texture. In one embodiment, this is handled by having two prerendered line textures, one in one direction, and one in the other direction. A determination is made as to the direction of the destination diagonal line, and the appropriate prerendered line texture is used depending on the direction of the destination line. This approach can be somewhat wasteful of scarce memory resources. As a result, a second approach using mirroring can be employed.

To avoid having to store two prerendered line textures, mirroring is used. In mirroring, the stored prerendered line texture is logically flipped about the vertical axis at its center so that the effective line is being drawn in the other direction.

Psuedo code for creating a destination diagonal line having a longer horizontal component and in the opposite direction from the prerendered line texture as described in flow chart 800 according to an embodiment is provided in listing 6.

Listing 6. Pseudo code for rendering stretched vertical line in direction opposite that of prerendered line texture according to an embodiment.

```
© 2011, The DIRECTV Group, Inc.
void blit_reversed_stretched_vertical_lines(int x1, int y1, int x2, int y2)
// (x1,y1) is the start point on the screen for the destination diagonal line
// (x2,y2) is the end point on the screen for the destination diagonal line
{
   int x_delta = x2 - x1 - 1, y_delta = y2 - y1 + 1;
   int absolute_x_delta = abs(x2 - x1), absolute_y_delta =
   abs(y2 - y1);
   int blit_count = absolute_x_delta / texture_width + 1;
   int prev_x = 0, prev_y = 0, next_x = 0, next_y = 0;
   for (int i = 0; i < blit_count; i++)
      {
         next_x = (i + 1) * x_delta / blit_count;
         next_y = next_x * y_delta / x delta;
         source.x = line_offset + (prev_x - next_x);
         source.y = line_offset;
         source.width = next_x - prev_x;
         source.height = prev_x - next_x + line_offset;;
         dest.x = next_x + x1 + 1;
         dest.y = prev_y + y1;
         dest.width = prev_x - next_x;
         dest.height = next_y - prev_y;
         // In an embodiment, values are modified depending on if it is
         // the first, last, or a middle blit
         if (i == 0) //first blit
         {
            source.width -= line_offset;
            dest.width += line_offset;
            dest.height = (next_x - line_offset) * (y_delta / x_delta) -
            prev_y;
         } else if (i == blit_count - 1) // last blit
         {
            source.x += line_offset;
            source.y -= line_offset;
            source.width -= line_offset;
            dest.height = next_y - (prev_x + line_offset) * y_delta /
            x_delta;
            dest.width += line_offset;
            dest.y = y1 + (prev_x + line_offset) * y_delta / x_delta;
            dest.x -= line_offset;
         } else // middle blit
         {
            source.y -= line_offset;
            source.height += line_offset;
            dest.y = (prev_x + line_offset) * y_delta / x_delta + y1;
            dest.height = ((next_x - line_offset) * y_delta / x_delta) -
            ((prev_x + line_offset) * y_delta / x_delta);
         }
         blit(line_texture, source, dest);
         prev_x = next_x; prev_y = next_y;
      }
}
© 2011, The DIRECTV Group, Inc.
```

Psuedo code for creating a destination diagonal line having a longer horizontal component and in the opposite direction from the prerendered line texture as described in flow chart 800 according to an embodiment is provided in listing 7.

Listing 7. Pseudo code for rendering stretched horizontal line in direction opposite that of prerendered line texture according to an embodiment.

```
© 2011, The DIRECTV Group, Inc.
void blit_reversed_stretched_horizontal_lines(int x1, int y1, int x2,
int y2)
{
   int x_delta = x2 - x1 + 1, y_delta = y2 - y1 - 1;
   int absolute_x_delta = abs(x2 - x1), absolute_y_delta =
   abs(y2 - y1);
   int blit_count = absolute_y_delta / texture_width + 1;
   int prev_x = 0, prev_y = 0, next_x = 0, next_y = 0;
   for (int i = 0; i < blit_count; i++)
      {
         next_x = (i + 1) * y_delta / blit_count;
         next_y = next_x * x_delta / y_delta;
```

Listing 7. Pseudo code for rendering stretched horizontal line in direction opposite that of prerendered line texture according to an embodiment.

```
        source.x = line_offset + prev_y – next_y;
        source.y = line_offset;
        source.width = next_y – prev_y – line_offset;
        source.height = prev_y – next_y;
        dest.x = prev_x + x1;
        dest.y = prev_y + y1 + 1;
        dest.width = next_x – prev_x;
        dest.height = prev_y – next_y;
        // In an embodiment, values are modified depending on if it
        // is the first, last, or a middle blit
        if (i == 0) //first blit
        {
          source.height += line_offset;
          dest.width += line_offset;
          dest.height = (next_y – line_offset) * (x_delta / y_delta) –
            prev_x;
        } else if (i == blit_count – 1) //last blit
        {
          source.x += line_offset;
          source.y -= line_offset;
          source.height += line_offset;
          dest.width = next_x – (prev_y + line_offset) * x_delta /
            y_delta;
          dest.height += line_offset;
          dest.x = x1 + (prev_y + line_offset) * x_delta / y_delta;
          dest.y -= line_offset;
        } else //middle blit
        {
          source.x += line_offset;
          source.width -= line_offset;
          dest.x = (prev_y + line_offset) * x_delta / y_delta + x1;
          dest.width = ((next_y – line_offset) * x_delta / y_delta) –
            ((prev_y + line_offset) * x_delta / y_delta);
        }
        blit(line_texture, source, dest);
        prev_x = next_x; prev_y = next_y;
      }
    }
    © 2011, The DIRECTV Group, Inc.
```

Pseudocode for creating a destination diagonal line having a longer vertical component for a single blit rendering as described in flow chart 800 according to an embodiment is provided in listing 8.

Listing 8. Pseudo code for rendering single blit vertically stretched line according to an embodiment.

```
© 2011, The DIRECTV Group, Inc.
void blit_single_vertical_line(int x1, int y1, int x2, int y2, bool reversed)
{
  int x_delta = x2 – x1 + 1, y_delta = y2 – y1 + 1;
  int absolute_x_delta = abs(x2 – x1), absolute_y_delta =
    abs(y2 – y1);
  int width = absolute_x_delta + line_width;
  //if reversed is true the line is in the opposite direction from the
  //prerendered line texture
  if (reversed)
  {
    source.x = width;
    source.y = line_offset;
    source.width = –width;
    source.height = –source.y;
    dest.x = x1;
    dest.y = y1 – absolute_y_delta – line_offset;
  }
  else
  {
    source.x = line_offset
    source.y = 0;
    source.width = absolute_y_delta + 1;
    source.height = absolute_y_delta + line_widtj;
```

Listing 8. Pseudo code for rendering single blit vertically stretched line according to an embodiment.

```
    dest.x = x1;
    dest.y = y1 – line_offset;
  }
  dest.width = x_delta + 1;
  dest.height = absolute_y_delta + line_width;
  blit(line_texture, source, dest);
}
© 2011, The DIRECTV Group, Inc.
```

Pseudocode for creating a destination diagonal line having a longer horizontal component for a single blit rendering as described in flow chart 800 according to an embodiment is provided in listing 9.

Listing 9. Pseudo code for rendering single blit vertically stretched line according to an embodiment.

```
© 2011, The DIRECTV Group, Inc.
void blit_single_horitzonal_line(int x1, int y1, int x2, int y2, bool reversed)
{
  int x_delta = x2 – x1 + 1, y_delta = y2 – y1 + 1;
  int absolute_x_delta = abs(x2 – x1), absolute_y_delta =
    abs(y2 – y1);
  int width = absolute_x_delta + line_width;
  //if reversed is true the line is in the opposite direction from the
  //prerendered line texture
  if (reversed)
  {
    source.x = line_offset;
    source.y = absolute_y_delta + line_width;
    source.width = absolute_y_delta + 1;
    source.height = –source.y;
    dest.x = x1;
    dest.y = y1 – absolute_y_delta – line_offset;
  }
  else
  {
    source.x = line_offset
    source.y = 0;
    source.width = absolute_y_delta + 1;
    source.height = absolute_y_delta + line_width;
    dest.x = x1;
    dest.y = y1 – line_offset;
  }
  dest.width = x_delta + 1;
  dest.height = absolute_y_delta + line_width;
  blit(line_texture, source, dest);
}
© 2011, The DIRECTV Group, Inc.
```

Figure 10:
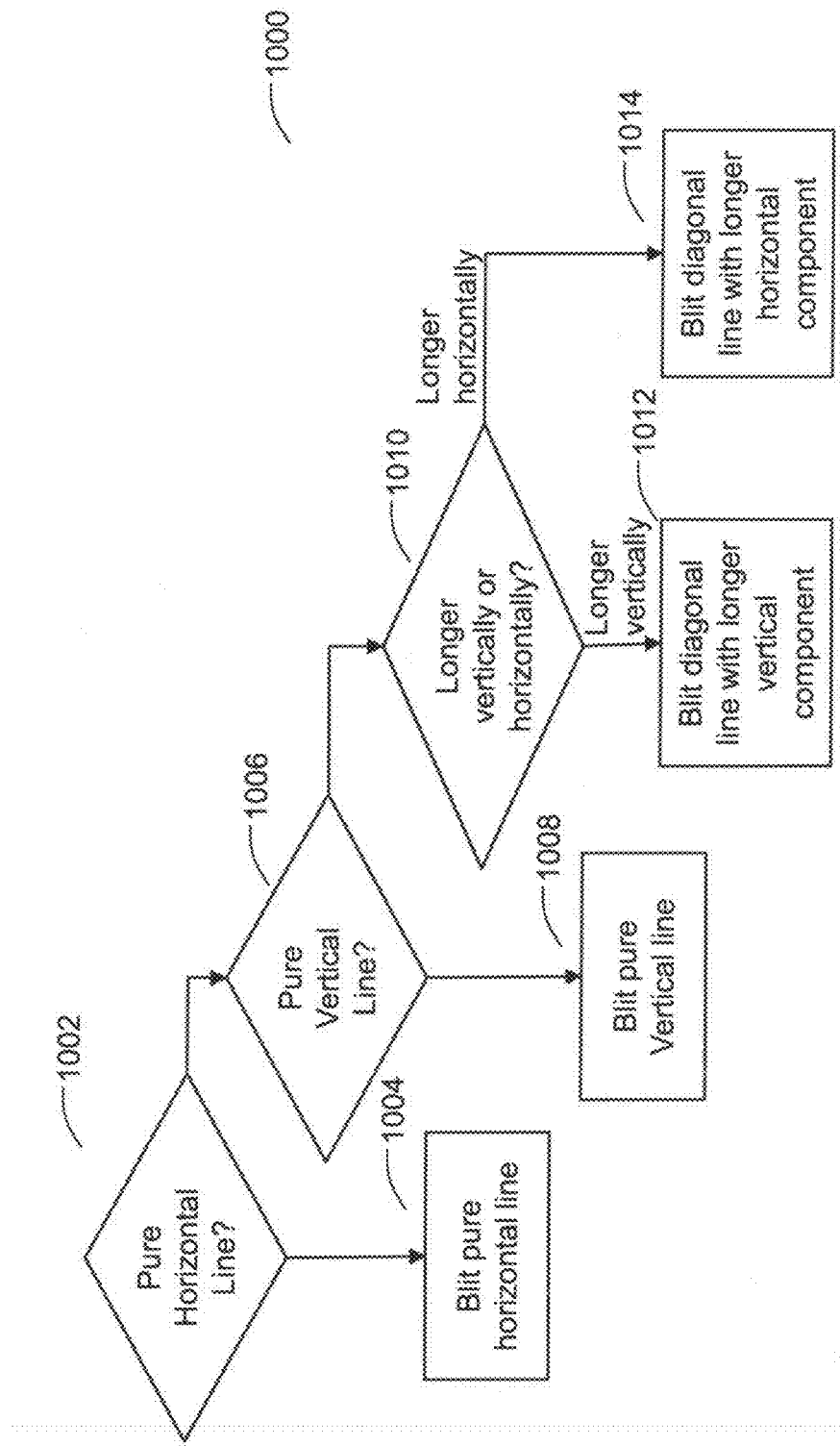
FIG. 10 is a flow chart for a method of invoking the line drawing functions described herein in accordance with one or more embodiments.

FIG. 10 is a flow chart 1000 for a method of invoking the above-described functions according to an embodiment. In step 1002, it is determined whether the line to be rendered is a pure horizontal line. If the line to be rendered is a pure horizontal line, processing continues in step 1004 with rendering of a pure horizontal line from the prerendered line texture. If the line to be rendered is not a pure horizontal line, processing continues in step 1006, where it is determined it is determined whether the line to be rendered is a pure vertical line. If the line to be rendered is a pure vertical line, processing continues in step 1008 with rendering of a pure vertical line from the prerendered line texture. If the line to be rendered is not a pure vertical line, processing continues in step 1012, where it is determined whether the line to be rendered is longer vertically or horizontally. If the line to be rendered is longer vertically, processing continues in step 1012 with rendering of a diagonal line having a longer vertical component from the prerendered line texture. As described above, to render a diagonal line having a longer vertical component, the prerendered line texture is tiled horizontally and stretched vertically. If, on the other hand, the line to be rendered is longer horizontally, processing continues in step 1014 with rendering of a diagonal line having a longer horizontal component from the prerendered line texture. As described above, to render a diagonal line having a longer horizontal component, the prerendered line texture is tiled vertically and horizontally.

Pseudo code for a wrapper for invoking the above-described functions according to an embodiment is provided in listing 10.

Listing 10. Pseudo code for a wrapper for invoking the above-described functions.

```
© 2011, The DIRECTV Group, Inc.
void draw_line(int x1, int y1, int x2, int y2)
{
   if (y1 == y2) //horizontal line
   {
      blit_horizontal_line(x1, y1, x2, y2);
      return;
   }
   If (x1 == x2) //vertical line
   {
      blit_vertical_line(x1, y1, x2, y2);
      return;
   }
   int xdelta = x2 - x1;
   int ydelta = y2 - y1;
   int slope = (y1 - y2) / (x1 - x2);
   int blit_count = abs(xdelta) / texture_width + 1;
   If (blit_count = 0)
   {
      return;
   }
   if (abs(xdelta) < abs(ydelta))
   {
      // vertically longer
      if (ydelta < 0)
      {
         swap(x1, x2); // In an embodiment, swap to draw
         swap(y1, y2); // in the same direction for the given slope
      }
      If (blit_count = 1)
      {
         If (ydelta < 0)
            void blit_single_vertical_line(x1,y1,x2,y2,TRUE);
         else
            void blit_single_vertical_line(x1,y1,x2,y2,FALSE);
         return;
      }
      if (slope >= 0)
         blit_stretched_vertical_lines(x1, y1, x2, y2);
      else
         blit_reverse_stretched_vertical_lines(x1, y1, x2, y2);
   }
   else
   {
      // horizontally longer
      if (xdelta < 0)
      {
         swap(x1, x2); // In an embodiment, swap to draw
         swap(y1, y2); // in the same direction for the given slope
      }
      If (blit_count = 1)
      {
         If (xdelta < 0)
            void blit_single_horizontal_line(x1,y1,x2,y2,TRUE);
         else
            void blit_single_horizontal_line(x1,y1,x2,y2,FALSE);
         return;
      }
      if (slope >= 0)
         blit_stretched_horizontal_lines(x1, y2, x2, y2);
      else
         blit_reversed_stretched_horizontal_lines(x1, y2, x2, y2);
```

-continued

Listing 10. Pseudo code for a wrapper for invoking the above-described functions.

```
   }
}
© 2011, The DIRECTV Group, Inc.
```

In an embodiment, adjustments are made to handle boundary conditions depending upon whether a first blit, a last blit, or a middle blit is being processing for rendering a particular destination diagonal line. As a result first blits, last blits and middle blits may be handled somewhat differently. Such processing is described in listings 4-7.

In an embodiment, if the line the destination diagonal line is shorter than the prerendered line texture, no tiling is performed. In such a case, the line is stretched only to make the desired angle.

In an embodiment, additional memory savings is obtained by using only the alpha channel color for the pixels in the prerendered line texture. In an embodiment, the color provided for the alpha channel is a default color set for the alpha channel. Consequently, only one byte per pixel is required for color in the prerendered line texture. This also provides true anti-aliasing over live video as color blending is performed by native STB graphic and composition hardware rather than the CPU.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system to render a destination diagonal line having a vertical component and a horizontal component on a screen display, comprising:
   a frame buffer to store data to be displayed on the screen display;
   a processor to generate a destination rectangle in the frame buffer and a prerendered line texture, wherein the prerendered line texture corresponds to at least a portion of the destination diagonal line, and includes a line that has a line width, and that comprises line pixels and anti-aliasing pixels, wherein the processor determines pixel intensity of the anti-aliasing pixels in accordance with the line width such that if the line width is smaller than a predetermined line width, pixel intensity of each anti-aliasing pixel is determined as a function of the line width, and wherein if the width is larger than the predetermined line width, pixel intensity of each anti-aliasing pixel is determined a function of anti-aliasing pixel distance from the line;

a memory that has a source rectangle in which to store the prerendered line texture; and a blitter to blit the prerendered line texture from the source rectangle in the memory to the destination rectangle in the frame buffer, wherein the blitter stretches the prerendered line texture in a direction corresponding to the longer of the vertical and horizontal components and tiles the entire stretched prerendered line texture in a direction corresponding to the shorter of the vertical and horizontal components.

2. The system recited in claim 1, wherein the coordinates of the destination rectangle for a particular blit are determined to maintain continuity of the destination diagonal line.

3. The system of claim 1, wherein if the determined intensity for an anti-aliasing pixel is greater than or equal to 1, the intensity of the anti-aliasing pixel is set to a maximum intensity and wherein if the intensity determined for the anti-aliasing pixel is less than zero, the intensity of the anti-aliasing pixel is set to zero.

4. The system of claim 1, wherein the processor is a fixed point processor and calculations are performed using fixed point numbers with a predetermined bit shift value to accommodate floating point calculations using the fixed point processor.

5. The system of claim 1, wherein the prerendered line texture is rendered in an alpha channel, and the blitter automatically alpha blends the rendered line with an image appearing on the screen behind the rendered line.

6. The system of claim 1, wherein coordinates for the destination rectangle are determined to maintain continuity of the diagonal destination line.

7. The system of claim 1, wherein the blitter mirrors the prerendered line texture prior to blitting.

8. The system of claim 1, wherein a size of the destination rectangle size is determined in accordance with the required stretching of the prerendered line texture.

9. The system of claim 1, wherein the processor determines a number of blits required to generate the destination diagonal line in a direction corresponding to the shorter of the vertical and horizontal components.

10. A method to render a destination diagonal line having a vertical component and a horizontal component on a screen display, comprising:

storing in a frame buffer data to be displayed on the screen display;

generating a destination rectangle in the frame buffer;

generating a prerendered line texture, wherein the prerendered line texture corresponds to at least a portion of the destination diagonal line, and includes a line that has a line width, and that comprises line pixels and anti-aliasing pixels, wherein the processor determines pixel intensity of the anti-aliasing pixels in accordance with the line width such that if the line width is smaller than a predetermined line width, pixel intensity of each anti-aliasing pixel is determined as a function of the line width, and wherein if the width is larger than the predetermined line width, pixel intensity of each anti-aliasing pixel is determined a function of anti-aliasing pixel distance from the line;

storing the prerendered line texture in a source rectangle in a memory; and blitting the prerendered line texture from the source rectangle in the memory to the destination rectangle in the frame buffer, wherein the blitter stretches the prerendered line texture in a direction corresponding to the longer of the vertical and horizontal components and tiles the entire stretched prerendered line texture in a direction corresponding to the shorter of the vertical and horizontal components.

11. The method of claim 10, further comprising determining the coordinates of the destination rectangle for the blitting to maintain continuity of the destination diagonal line.

12. The method of claim 10, further comprising setting the intensity of an anti-aliasing pixel to a maximum intensity if the determined intensity for the anti-aliasing pixel is greater than or equal to 1, and setting the intensity of the anti-aliasing pixel to zero if the determined intensity for the anti-aliasing pixel is less than zero.

13. The method of claim 10, further comprising using a fixed point processor and performing calculations using fixed point numbers with a predetermined bit shift value to accommodate floating point calculations using the fixed point processor.

14. The method of claim 10, further comprising rendering the prerendered line texture in an alpha channel, and the alpha blending the rendered line with an image appearing on the screen behind the rendered line.

15. The method of claim 10, further comprising determining coordinates for the destination rectangle to maintain continuity of the diagonal destination line.

16. The method of claim 10, further comprising mirroring the prerendered line texture prior to blitting.

17. The method of claim 10, further comprising determining a size of the destination rectangle size in accordance with the required stretching of the prerendered line texture.

18. The method of claim 10, further comprising determining a number of blits required to generate the destination diagonal line in a direction corresponding to the shorter of the vertical and horizontal components.

* * * * *